Figure 1:
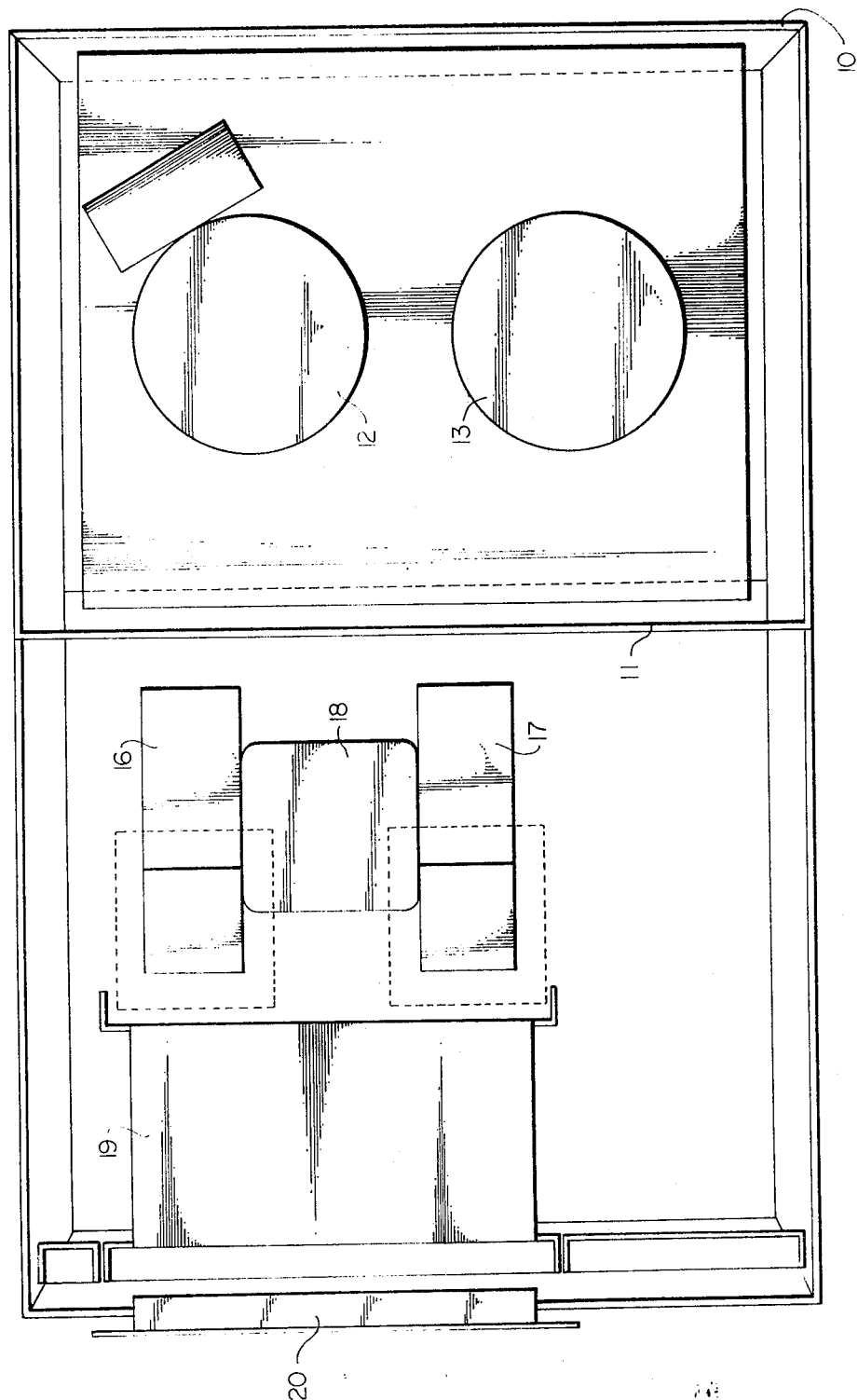

United States Patent

Maddox, Jr.

[15] 3,651,864
[45] Mar. 28, 1972

[54] COMPACT ROOM SIZE ENVIRONMENTAL CONTROL UNIT

[72] Inventor: Carl I. Maddox, Jr., Chamblee, Ga.

[73] Assignee: The United States of America as represented by the Secretary of the Department of Health, Education and Welfare

[22] Filed: Apr. 10, 1970

[21] Appl. No.: 27,385

[52] U.S. Cl. .................................................165/20, 161/60
[51] Int. Cl. ...............................................................F24f 3/14
[58] Field of Search ...............................165/19, 20, 60, 21

[56] References Cited

UNITED STATES PATENTS 2,488,636  11/1949  Mendenhall et al. ....................165/20
2,023,622  12/1935  Textorius et al. ........................165/20

Primary Examiner—Charles Sukalo
Attorney—Browdy and Neimark

[57] ABSTRACT

A self contained compact room air conditioning unit has means for automatically controlling temperature and humidity for both heating and cooling cycles. The unit rapidly conforms to preset temperature and humidity by means of continuously operable control devices selectively actuating cooler, humidifier and heater means. Air is continually circulated through the unit between spaced heater and cooler grills. Such features are provided as variable capacity heater means and a dehumidification cycle by the cooler with provisions for increasing the heater capacity to compensate for cooling if dehumidification is called for when heating the room.

3 Claims, 6 Drawing Figures

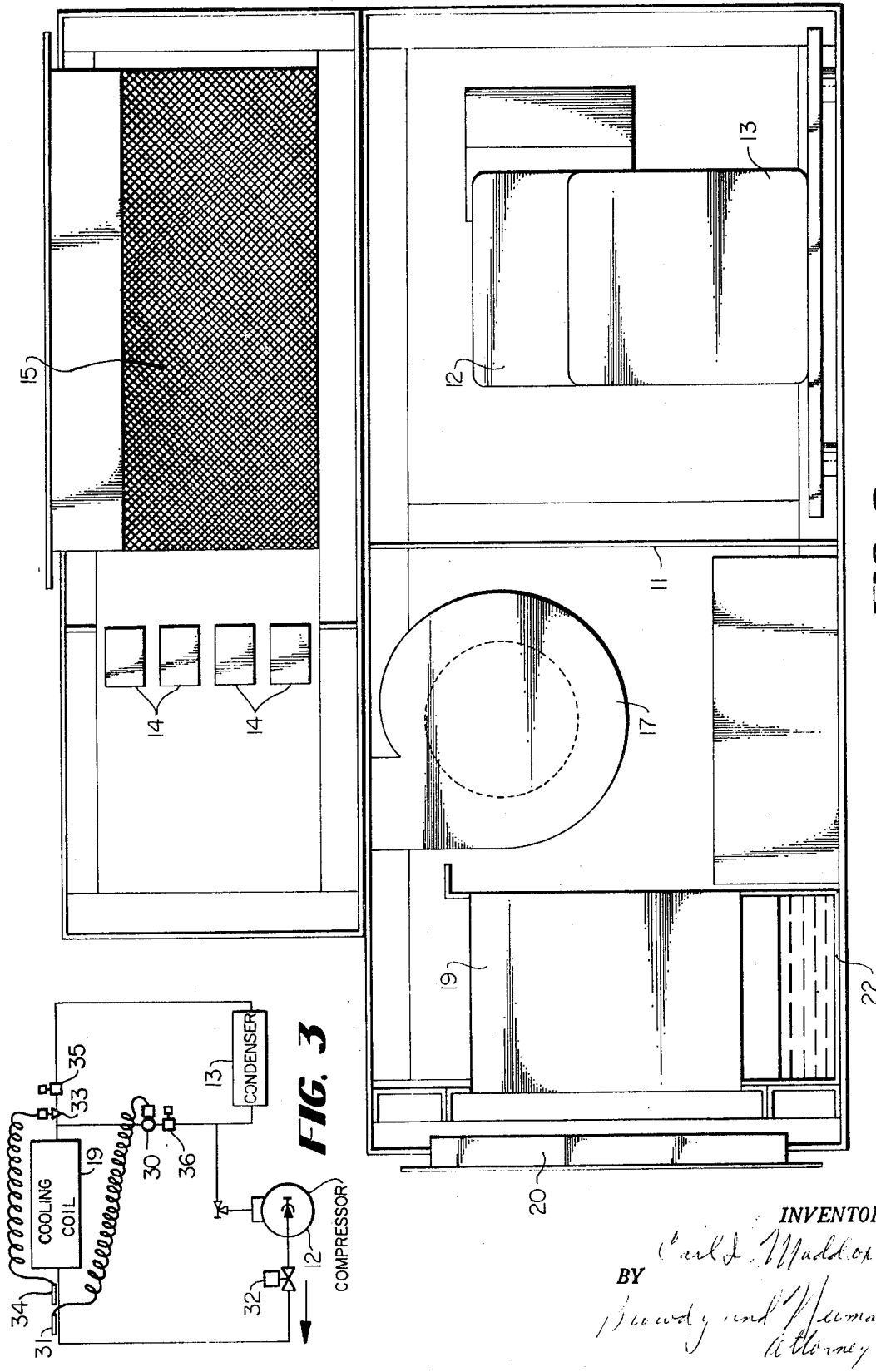

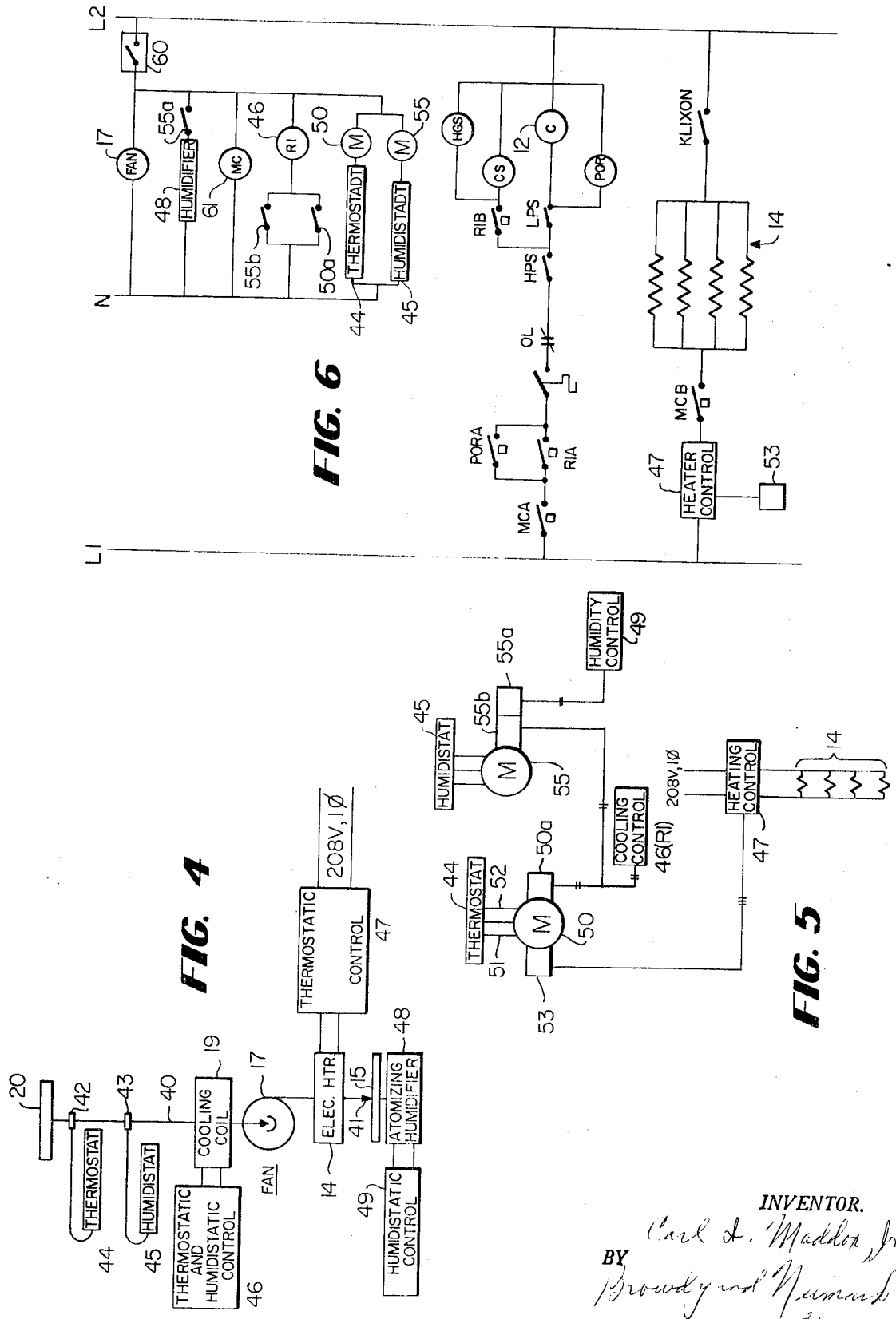

COMPACT ROOM SIZE ENVIRONMENTAL CONTROL UNIT

This invention relates to air conditioning means and more particularly it relates to a compact self contained room air conditioner unit controlling temperature with separate heater and cooler means and controlling humidity continuously during heating and cooling cycles.

Air conditioning units have been available in the prior art for central installations, but compact self contained room air conditioners to maintain a single room closely to predetermined temperature and humidity settings satisfactorily have not been available.

In compact units the controls over temperature and humidity have not been easily maintained within close limits because of cycling on-off controls of heat or cooling cycles and particularly because of the long time cycle necessary to adjust humidity levels in prior art devices. Consider for example that because of heavy power loads on starting cooler compressors and heaters, devices of the prior art generally cannot be turned on and off frequently to maintain exact temperatures and this results in a cycling between two widely separated temperatures at which the devices are switched on and off. Yet there has been a significant need for precise constant control of air condition in laboratory and sick room environment, for example, with an inexpensive and effective single room unit. Particularly this is important where adjacent rooms need be controlled at different settings.

It is therefore an object of this invention to provide a compact self-contained room air conditioning unit with operational controls and capacity to quickly and accurately hold temperature and humidity within close tolerances.

It is a further object of the invention to provide a compact efficient air conditioning unit with controls maintaining air condition without significant temperature or humidity fluctuations.

Another object of the invention is to provide a compact air conditioning unit which will rapidly adjust to requirements for changes in humidity.

Therefore in accordance with the present invention there is provided an air conditioning unit that can be placed in a unitary cabinet of about 12 cubic feet capacity having built into it a compressor, compressor motor, water cooled condenser, direct expansion cooling coil, refrigerant liquid line, solenoid valve controls, pressure limiting expansion valve, refrigerant stop valves at compressor suction and discharge lines, compressor cut out controls, 2,000 watts of electrical heaters with solid state heater power controls for maintaining heat levels over a wide range, a double blower, an atomizer type humidifier located outside the cabinet in the room and a dehumidification condensate drain pan. The cooler operating with either a water supply or an external water cooling tower has a cooling capacity of about 7,000 BTU/Hour and the heating capacity is about 6,800 BUT/Hour. The humidifier capacity is about five pounds of added water vapor per hour and the blower delivers about 275 cubic feet of air per minute.

The room air is pulled into the unit by blower suction and is cooled, heated, humidified and dehumidified automatically in accordance with operational settings of humidistat and thermostat controllers. The air after passing the cooler station is passed over electrical heating elements where heat is added if necessary to offset cooling due to dehumidification or to raise the room temperature to the preset valve. When humidification is called for the jet or atomizer type humidifier station located in the room is actuated by the humidistat controls. Typically the room temperatures may be maintained within 1° F. and the humidity within three percent at temperature ranges between 60° and 100° F. and humidities from 50 to 90 percent.

Other features, advantages and objectives of the invention will be found throughout the following description of a preferred embodiment shown in the accompanying drawings, wherein:

FIG. 1 is a plan sketch of an air conditioner unit layout with top cabinet panel removed, FIG. 2 is an elevation sketch of the unit of FIG. 1 taken along lines 2—2, FIG. 3 is a schematic diagram of the refrigeration system used in the air conditioner unit, FIG. 4 is a schematic diagram of the air flow path used in the air conditioner unit, FIG. 5 is a block schematic diagram of the control circuits, and FIG. 6 is a schematic circuit diagram of the control circuits.

Referring now to FIGS. 1 and 2, there is a rectangular outer cabinet or housing member 10 approximately 2 feet wide by 3 feet long and 2 feet high, in the right hand portion of which a refrigeration unit 11 comprising a compressor 12 and condenser 13 with corresponding piping and controls are located.

Above the compressor unit 11 at the top of the cabinet is an air flow path portion having therein a set of electrical heaters 14 and an outlet grille opening 15, into which air is forced by means of dual fans 16, 17 driven by the motor 18 continuously running when the power switch for the unit is on. Air is sucked by the fans 16, 17 through a cooling coil 19 from a grille opening 20 which is arranged at 90° from the outlet or supply grille opening 15 to enhance circulation of air throughout the room in which the unit is installed. Since the grilles 15 and 20 are on two adjacent sides of the unit, it may be installed under a table or workbench with the top of the unit covered.

A humidifier of the jet spray or atomizer type (not shown) is located somewhere outside the cabinet within the room being conditioned to thereby add water vapor to the processed and/or heated air leaving the unit. A condensate pan 22 is located below the cooling coil 19 to receive water removed from air entering the input grille 20, and an outlet pipe may lead to a sump or drain for automatic removal of excess water.

The refrigeration system is operated as shown by the schematic diagram of FIG. 3. Thus the compressor 12 is energized through a drive motor upon a demand for cooling by either the thermostat or humidistat controls. The compressor will operate on pump-down control through a low pressure switch and a pump out relay to be later described. The compressor capacity is controlled by operation of the discharge pressure regulator arrangement 30, 31 and the by pass piping arrangement. Other controls are provided such as crankcase pressure regulator 32, thermostatic expansion valve 33, and corresponding thermal bulb 34, liquid line solenoid valve 35 and hot gas solenoid valve 36. Also incorporated in the refrigerant lines may be a sight glass, if desired. The heat exchange unit may either be connected to a domestic water supply or a cooling tower system located outside the room by a conventional piping system.

The air flow path through the unit may be seen from the schematic view of FIG. 4, where air is sucked into grille 20 by continuously running fan 17 and forced out grille 15 along a flow path identified by line 40 in the direction of arrow 41. Input air is sensed by thermostatic detector 42 and humidistatic detector 43 which direct operation of corresponding thermostatic control means 44 and humidistatic control means 45. Thus incoming room air conditions are sensed before any control, which is first effected in the air path at cooling coil 19 under direction of either thermostatic or humidistatic control as effected in control unit 46. Thereby the temperature of the air is cooled and in this process water is removed by cooling coil 19. Thus, a dehumidification operation is attained and also a cooling operation whenever the cooling unit is actuated by a predetermined temperature setting on the thermostat 44 which requires ambient temperature to be reduced, or a humidity setting on humidistat 45 which requires the humidity to be decreased.

Similarly electric heater unit 14 is controlled by the thermostat 44 at the control center 47 to operate when the temperature should be raised because of the thermostat setting or when the cooling effect of coil 19 is to be offset when dehumidification is required without a cooling effect.

The atomizing humidifier 48 can react quickly to raise humidity to a required level controlled by humidistat 45 through control circuit 49 by spraying or atomizing water vapor in the heated or conditioned air path just after it leaves the conditioning unit.

Electrical thermostatic and humidistatic controls are effected in the manner illustrated by the block circuit diagram of FIG. 5. For temperature control the thermostat 44 senses differences from a required setting in a conventional manner and operates bi-directional motor 50 in a corresponding direction to the required corrective action by means of signals on leads 51 or 52. If cooling is designated, the motor passes to a position in one direction of rotation to operate switch 50A and actuate the cooling unit through control circuits 46.

When heating is designated the motor 50 operating in the opposite direction controls the variable setting of potentiometer 53 throughout a variable range controlling the amount of heat necessary from heater elements 14. These coils 14 are controlled by solid state heating control circuits 47 as a function of the setting of potentiometer 53 to operate over a range from low to high heat output levels, to thereby precisely maintain the required heat level without temperature fluctuations caused with on-off heat control cycling.

Humidistat 45 also similarly controls a bi-directional motor 55 to operate switches 55A and 55B respectively when humidity needs to be increased or decreased. Thus switch 55A controls operation of the humidifier spray motor 49 when humidity increases are called for. Conversely switch means 55B operates the cooling circuit controls 46 when humidity decreases are called for. The thermostat 44, through operation of motor 50, potentiometer 53, and heat controller 47 will increase heat output from heaters as necessary to offset the cooling of the air by the cooling coils whenever the cooling coils are in operation for dehumidification.

Electrical control circuit details may be seen more specifically in the electrical diagram of FIG. 6. The off-on switch 60 turns on fan 17 to run continuously from single phase 110 volt lines N-L2 and also activates the heater and cooler systems operating from 220 volt single phase lines L1-L2 through master control relay 61 and contacts MCA and MCB. The master control prevents operation of the compressor and heater if the line voltage falls below normal to prevent damage.

Further control is effected by thermostat 44 in operating motor 50 and contacts 50A or potentiometer 53 or humidistat in operating motor 55 and corresponding contacts 55A and 55B in the manner hereinbefore described. Thus, humidifier 48 is activated by contacts 55A and the cooler relay 46 is energized by contacts 50A and 55B.

Cooler compressor 12 is connected for operation by relay 46 contacts R1A if the master control contacts MCA are closed and the various protective controls are in proper condition. Thus, high pressure switch HPS, low pressure switch LPS, overload controls OL and thermal control T are all in normal position connecting the compressor 12 across the lines L1-L2. Once the cooling cycle relay R1 is deenergized, the pump out relay POR operates its contacts PORA to maintain the compressor energized as long as necessary. Also the hot gas solenoid HGS and other control solenoids CS are energized by cooler relay contacts R1B whenever the other protective circuit contacts are not opened.

The heater elements 14 are protected by "Klixon" contacts, and are operated by potentiometer 53 and solid state circuits 47 in the manner hereinbefore described.

What is claimed is:

1. A self-contained individual room air conditioning unit for sick room and laboratory usage comprising
   a cabinet;
   a cooling unit of capacity about 7,000 BTU/hour within said cabinet, said cooling unit having a cooling coil, a compressor and a discharge pressure regulator means for selectively controlling the capacity of said compressor;
   blower means in said cabinet having a capacity of about 275 cubic feet of air per minute, said blower means including a fan circulating air from the room through a path including said cooling coil thereon;
   electrical heater means of a capacity of about 6,800 BTU/hour, said heater means comprising a plurality of elements located in said air path with means for selectively energizing the elements to produce a range of heat capacity;
   atomizer type humidifying means of capacity of about 5 lbs. of water per hour, said humidifying means being located to discharge selectively moisture in said circulating air path;
   control means to quickly and accurately hold temperature and humidity within close tolerances without significant fluctuations, said control means including adjustable thermostat means for establishing and maintaining a predetermined room temperature within 1° F. and connected to operate the heater means and cooling unit as the room temperature changes, and adjustable humidistat means for establishing and maintaining a predetermined room humidity within 3 percent and connected to operate the humidifier and the cooler as the room humidity changes; and
   wherein said circulating air path comprises in sequence, an air opening positioned to receive air from the room located in the lower part of said cabinet, thermostatic and humidistatic sensing means for sensing the condition of the air received from the room and passing signals to said control means, said cooling coil, said blower means for circulating said air, said electrical heater means, and an air opening positioned to discharge air into the room located in the lower part of said cabinet and directed in an air flow path to circulate air through the room, and further wherein said humidifying means is located to add water to the air after it passes said heater means.

2. An air conditioning unit as defined in claim 1 wherein the openings are in two adjacent sides of said cabinet, thereby permitting the unit to be installed beneath a table.

3. An air conditioning unit as defined in claim 1 wherein the said thermostat means comprises a bidirectionally rotatable motor which operates a switch energizing said compressor at one limit of rotation and a potentiometer when rotated in the opposite direction connected to variably control the amount of heat from said elements; and
   wherein said humidistat means comprises a second bidirectionally rotatable motor which operates separate switches as said second motor is operated in opposite directions, one said switch being connected to operate said humidifier and the other said switch being connected to energize said cooling unit

* * * * *